No. 694,928. Patented Mar. 4, 1902.
D. H. HOUSTON.
FOLDING ROLL HOLDING PHOTOGRAPHIC CAMERA.
(Application filed June 10, 1901.)
(No Model.)
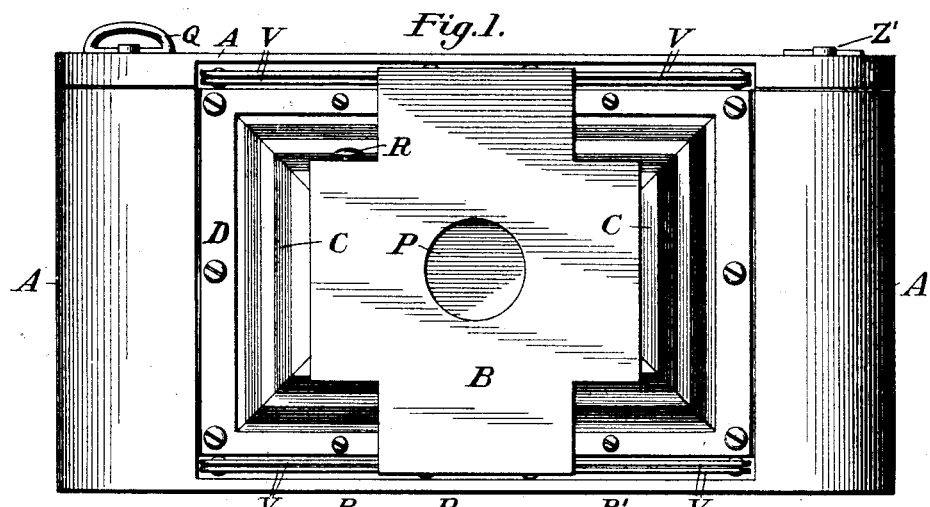
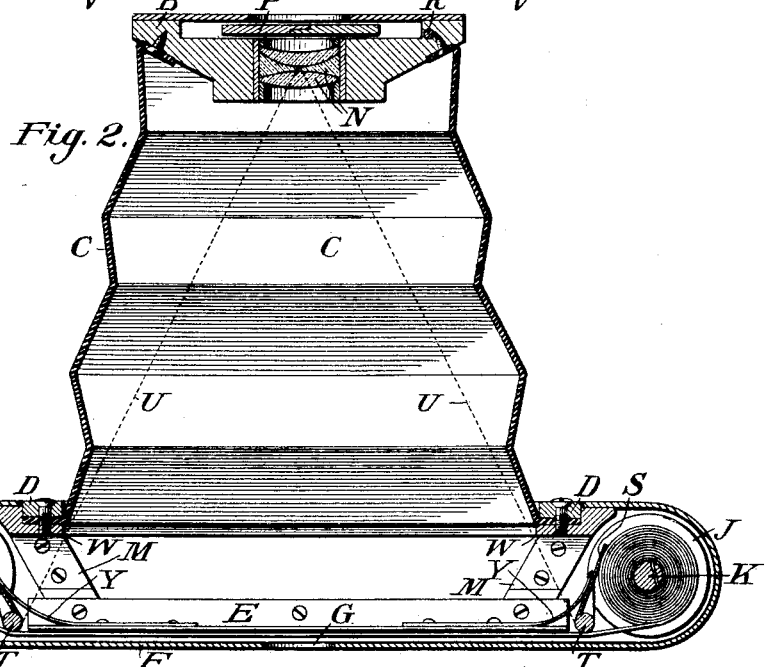
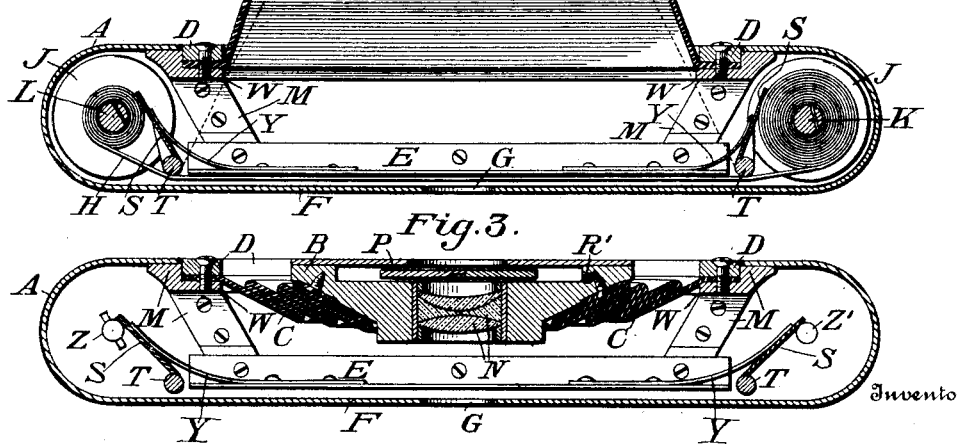
Witnesses
Axel Jacobson
H Gale
Inventor
David Henderson Houston

UNITED STATES PATENT OFFICE.

DAVID HENDERSON HOUSTON, OF HUNTER, NORTH DAKOTA.

FOLDING ROLL-HOLDING PHOTOGRAPHIC CAMERA.

SPECIFICATION forming part of Letters Patent No. 694,928, dated March 4, 1902.

Application filed June 10, 1901. Serial No. 64,016. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Folding Roll-Holding Photographic Cameras; and I do hereby declare the following to be a full, clear, and exact description of the invention, such as will enable others skilled in the art to which it appertains to make and use the same.

My invention relates to folding photographic cameras.

An object of my invention is to produce a very compact folding camera of substantial construction and having only one compartment for holding the rolls of sensitized film and exposing the film to rays of light passed through a lens.

Another object of my invention is to produce a camera having pivoted swinging brakes for producing tension upon the film, said brakes being adapted to exclude light from the parts of the film extended between the rounded guides and the rolls of sensitized film.

My invention consists of novel features of construction and combination of parts pointed out in the claims of this specification.

In the drawings similar characters of reference denote similar parts.

Figure 1 represents a front view of my camera closed, showing the rear frame of the camera-bellows fastened to the front part of the camera-casing. Fig. 2 represents a sectional plan view of my camera, showing the method of construction with one compartment. Fig. 3 represents a sectional plan view of my camera closed, having the film-rolls omitted and showing the spool and reel centering devices.

In the interior of my one-compartment folding camera there are no divisions, and the bellows is attached to the front side of the camera-casing and folds into the casing, together with the front of the camera and the parts carried thereby. The casing is braced by angle-braces rigidly attached to the interior sides of the casing, and there are film-edge guides extending between the rounded guides, and friction-brakes are pivoted to swing and bear upon the wrapper of the rolls of sensitized film and cause tension upon the film and also exclude light from the part of the film extended between the rounded guides and the rolls of sensitized film. The tension-brakes may be pivoted upon the same pivots as the rounded guides, and a spring is positioned to bear upon the pivoted brakes, and the brake-springs may be advantageously placed upon the film-edge guides.

A indicates the camera-casing; B, the camera-front; C, the bellows; D, the rear frame of the bellows; E, the film-edge guides; F, the rear side of the casing; G, the sight-aperture in the casing; H, the sensitized film and its wrapper; J, the flanges of the spools; K, the center of the supply-spool; L, the center of the reel-spool; M, the angle-braces; N, the lens; P, the shutter for the lens; Q, the winding-key; R, the touch-button; R', the touch-button stem; S, the pivoted brake for the film; T, the rounded guides for the film; U, dotted lines indicating the marginal rays of light passing from the lens to the ends of the picture position in the camera; V, the folding supports for the front of the camera.

W points out the corners of the angle-braces positioned to intercept the rays of light at the ray-lines U.

Y indicates the springs bearing upon the pivoted swinging brakes for the film-rolls; Z, the reel winding and centering device.

Z' is one of the supply-spool-centering devices.

Having described my invention, I claim—

1. In a photographic camera the combination of an oblong-shaped one-compartment casing for holding the spools of sensitized film and exposing the film to rays of light passed through a lens, spool-centering devices in one end of said casing, reel-centering devices in the opposite end of the casing, rounded guides for the sensitized film, said rounded guides positioned near the rear interior side of the casing, a bellows having its rear end connected at the front side of the casing, a front and lens and shutter closing the front end of said bellows, the front side of the camera-casing having ray-intercepting projections positioned at the right and left ends of the front aperture of the camera-casing, said ray-intercepting projections positioned in line between the rays of light passing the lens when in use and the said rounded guides positioned near the rear interior side of the casing, said front of the bellows and the parts carried thereby and the bellows all adapted to fold into the central portion of the said one-compartment casing and be carried in the central space between the supply and reel spools, and means for extending the bellows and supporting the front of said bellows in a position where the lens carried in said front will be focused upon the sensitized film when the said film is extended across the rear interior part of the said one-compartment casing.

2. In a photographic camera the combination of an oblong-shaped one-compartment casing for holding the spools of sensitized film and exposing the film to rays of light passed through a lens, spool-centering devices in one end of said casing, reel-centering devices in the opposite end of the casing, rounded guides for the sensitized film, said rounded guides positioned near the rear interior side of the casing, film-edge guides positioned at opposite interior sides of the casing and in line between the said rounded guides, a bellows having its rear end connected at the front side of the casing, a front and lens and shutter closing the front end of said bellows, said front of the bellows and the parts carried thereby and the bellows all adapted to fold into the central portion of the said one-compartment casing and be carried in the central space between the supply and reel spools, and means for extending the bellows and supporting the front of said bellows in a position where the lens carried in said front will be focused upon the sensitized film when the said film is extended across the rear interior part of the said one-compartment casing.

3. In a photographic camera the combination of an oblong-shaped one-compartment casing for holding the spools of sensitized film and exposing the film to rays of light passed through a lens, spool-centering devices in one end of the casing, reel-centering devices in the opposite end of the casing, rounded guides for the sensitized film, said rounded guides positioned near the rear interior side of the casing, a bellows having its rear end connected to a support-frame, said support-frame having angle-arms rigidly united to the inner edge sides of the camera-casing, a front and lens and shutter closing the front end of said bellows, said front of the bellows and the parts carried thereby and the bellows all adapted to fold into the central portion of the said one-compartment casing and be carried in the central space between the supply and reel spools, and means for extending the bellows and supporting the front of the said bellows in a position where the lens carried in said front will be focused upon the sensitized film when the said film is extended across the rear interior part of the said one-compartment camera.

4. In a photographic camera the combination of a one-compartment casing for holding the spools of sensitized film and exposing the film to rays of light passed through a lens, spool and reel centering devices in the casing, rounded guides for the sensitized film, light-excluding friction-brakes pivoted at the rounded guides, said light-excluding friction-brakes adapted to intercept light and thereby shield the parts of the sensitized film extended between the rounded guides and the rolls of film.

5. In a photographic camera the combination of a one-compartment casing for holding the spools of sensitized film and exposing the film to rays of light passed through a lens, spool and reel centering devices in the casing, rounded guides for the sensitized film, film-edge guides at opposite sides of the casing, springs supported upon the said film-edge guides, said springs positioned to bear upon light-excluding friction-brakes, said light-excluding friction-brakes pivoted to swing and extend from the said rounded guides to the roll of sensitized film.

In testimony whereof I affix my signature in presence of two witnesses.

DAVID HENDERSON HOUSTON.

Witnesses:
 AXEL JACOBSON,
 J. H. GALE.